United States Patent
McCool et al.

(10) Patent No.: US 6,898,584 B1
(45) Date of Patent: May 24, 2005

(54) MONITORING OF AIRCRAFT USAGE

(75) Inventors: Kelly McCool, Upper Marlboro, MD (US); David J. Haas, North Potomac, MD (US); Gene L. Barndt, Manassas, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 976 days.

(21) Appl. No.: 09/696,299

(22) Filed: Oct. 26, 2000

(51) Int. Cl.$^7$ .............................................. G05B 13/00
(52) U.S. Cl. ........................................................ 706/23
(58) Field of Search ...................... 706/23; 702/1–199

(56) References Cited

U.S. PATENT DOCUMENTS 4,336,595 A * 6/1982 Adams et al. ................ 702/34
5,180,911 A 1/1993 Grossman et al.
5,751,609 A 5/1998 Schaefer, Jr. et al.

* cited by examiner

*Primary Examiner*—Anthony Knight
*Assistant Examiner*—Michael B. Holmes
(74) *Attorney, Agent, or Firm*—Jacob Shuster

(57) ABSTRACT

An algorithm housed within a rotorcraft, controls real time generation of signals reflecting sensor measurement of plural parameters in accordance with a programmed sequence operationally intermapped pursuant to a linear or non-linear equation with calculations therefrom of estimates to provide an accurate determination of flight usage from which to evaluate and detect excessive damage with respect to components of the aircraft.

3 Claims, 2 Drawing Sheets

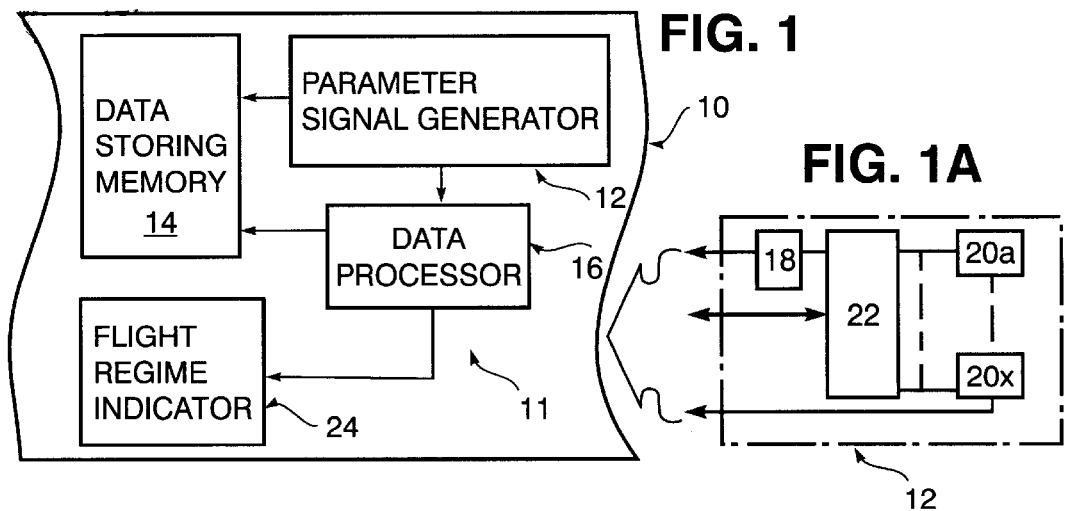
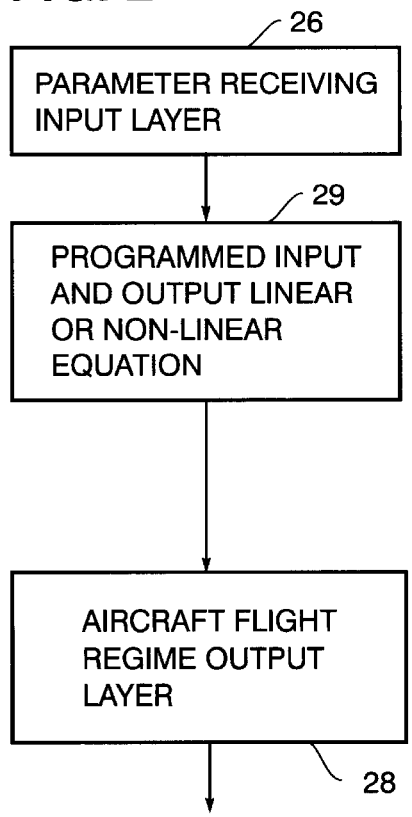

MONITORING OF AIRCRAFT USAGE

The present invention relates generally to monitoring operation of aircraft.

BACKGROUND OF THE INVENTION

Presently, aircraft such as helicopters undergo evaluation with respect to fatigue damage in a very conservative manner based on calculations which rely on assumptions of worst case aircraft usage because of a lack of detailed logging of maneuvers flown. Aircraft components are accordingly often replaced at unnecessarily frequent intervals based on estimations derived from such conservative assumptions.

In connection with rotor craft, a variable state data estimating system has already been disclosed in U.S. Pat. No. 5,751,609 in connection with the calculation of airspeed, involving use of a programmed neural network. The use of a neural network involving pattern recognition has been disclosed in U.S. Pat. No. 5,180,911 to Grossman et al., in regard to value measurement of a variable state parameter such as structural strain. However such prior art analytical or neural network systems are not applied to accurate recognition and identification of aircraft flight regimes, so as to provide a reliable basis for evaluating flight usage of aircraft components, as an important object of the present invention.

SUMMARY OF THE INVENTION

In accordance with the present invention, determination of aircraft flight regime is derived by calculation from programmed measurements of plural flight conditions through a series of analytical rules or through a neural network system controlling generation of signals through which an output of the desired flight regime is obtained to accurately predict flight usage of aircraft components. Such system involves intermapping of flight sensed measurements with real time calculation of plural flight conditions during aircraft operation on the basis of a predetermined repeated sequence of programmed steps such as those disclosed in U.S. Pat. No. 5,751,609 to Schaefer, Jr., et al. in connection with airspeed.

BRIEF DESCRIPTION OF DRAWING

A more complete appreciation of the invention and many of its attendant advantages will be readily appreciated as the same becomes better understood by reference to the following detailed description when considered in connection with the accompanying drawing herein:

FIG. 1 is a symbolic representation of one embodiment of the present invention installed on a rotorcraft;

FIG. 1A is a block diagram depicting the signal generator component shown in FIG. 1, in greater detail;

FIG. 2 is a block diagram of basic intermapped apparatus components associated with the present invention.

DETAILED DESCRIPTION OF PREFERRED EMBODIMENT

Figure 3:
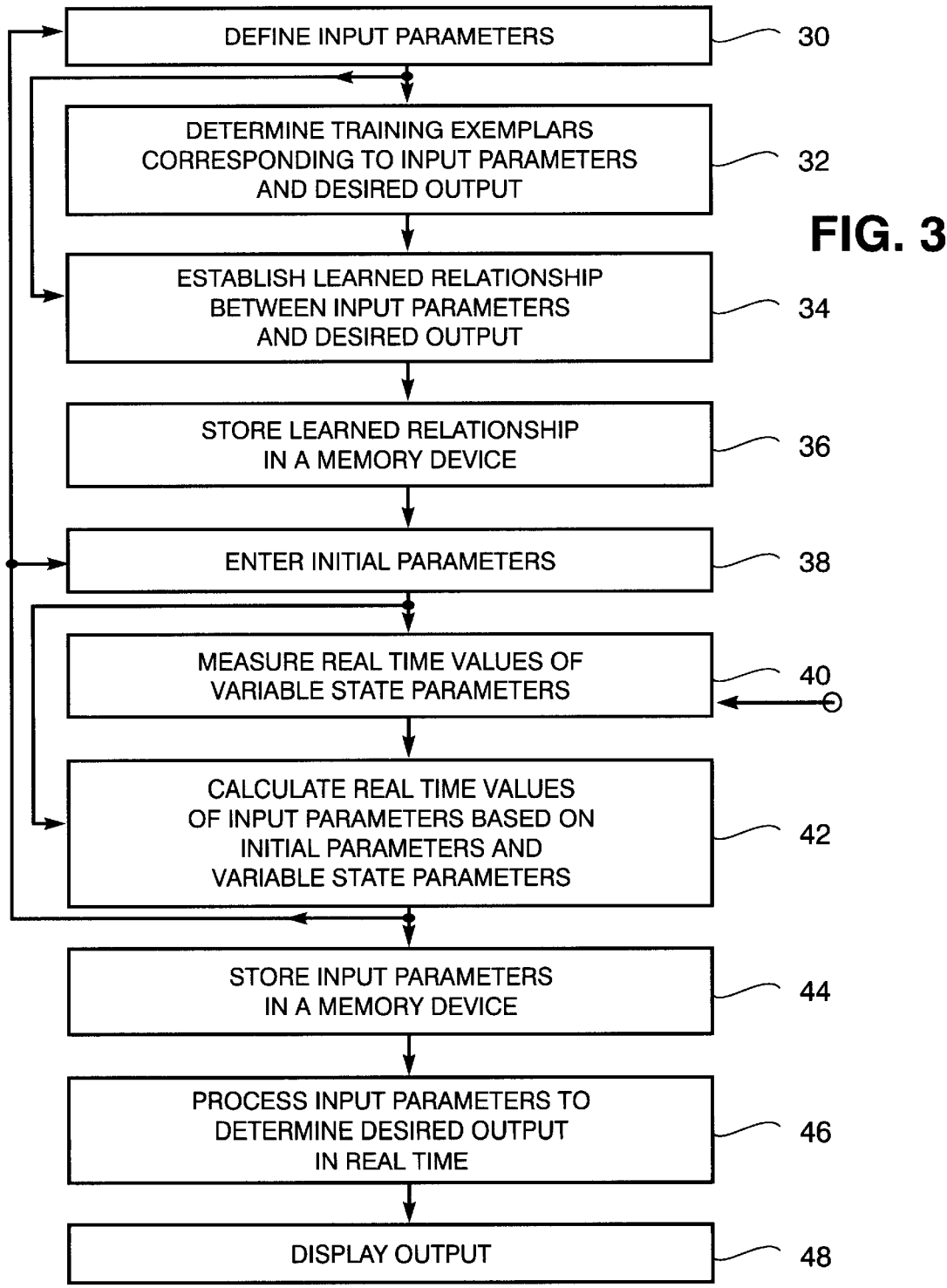
FIG. 3 is a procedural flow chart for practicing the present invention as depicted in FIGS. 1, 1A and 2.

Referring now to the drawing in detail, FIG. 1 symbolically depicts onboard installation of the present invention in a rotorcraft 10, in the form of a computer system generally referred to by reference numeral 11 having means 12 for generating a plurality of successive signals used as input parameters through which an aircraft flight regime is determined in accordance with at least one equation representing a linear or non-linear relationship between such input parameters and a flight regime output. As diagrammed in FIG. 1, output of the signal generating means 12 is fed to a memory device 14 for data storing purposes. A data processing means 16, responsive to signals received from the signal generating means 12 calculates an estimate of flight regime, based on the input parameters, and/or displays an indication of flight regime through a display indicator 24 coupled to the data processing means 16.

In accordance with one embodiment of the present invention, 10 aircraft parameter types are utilized from which flight regimes are identified. Such types may consist of:

1. Aircraft gross weight during flight;
2. aircraft center of gravity position during flight;
3. pilot stick and pedal positions;
4. aircraft attitudes;
5. aircraft angular rates;
6. aircraft accelerations;
7. total engine torque;
8. airspeed;
9. aircraft altitude; and
10. rotor speed.

The foregoing parameter types are respectively measured from sampling through sensors 20a–20x at a predetermined rate by the signal generating means 12 as denoted in FIG. 1A. The signal outputs of such sensors are fed to a calculator 22 through which a conversion from sensor voltages to engineering units occurs. Initial variable parameter values may also be inserted into the calculator 22 through data input means 18, such as a computer keyboard. Information generated on the engineering units by the calculator 22 of the signal generator 12 are then stored in the memory 14. According to one embodiment of the invention, information generated by the calculator 22 of the signal generator 12 is used by an on-board data processor to calculate regime information in flight for display to the pilot. According to another embodiment, the output of the calculator 22 is only stored in an on-board memory device. Upon completion of aircraft operation, the data stored in the memory device is then transferred to a ground based system through use of a data transfer device. One means through which flight regime recognition can be achieved, is to use a neural network.

The neural network referred to through which flight regime recognition may be achieved according to one preferred embodiment, is of a back propagation type. Successful use of such a neural network, involving regime identification algorithms, was heretofore documented through sample results of a recognition program. Such results are shown in the following table involving 14 flight regime maneuvers:

| | | Training Data | | Test Data | |
|---|---|---|---|---|---|
| | Maneuver Description | Maneuver Occurrences Evaluated | Percent Correctly Identified | Maneuver Occurrences Evaluated | Percent Correctly Identified |
| 1 | Hover | 6 | 100 | 31 | 89 |
| 2 | Level flight | 27 | 100 | 105 | 87 |
| 3 | Rearward flight | 7 | 100 | 24 | 100 |
| 4 | Left sideward flight | 8 | 100 | 24 | 92 |
| 5 | Right sideward | 16 | 100 | 44 | 100 |

-continued

| Maneuver Description | Training Data | | Test Data | |
|---|---|---|---|---|
| | Maneuver Occurrences Evaluated | Percent Correctly Identified | Maneuver Occurrences Evaluated | Percent Correctly Identified |
| flight | | | | |
| 6 Left sideslip | 6 | 100 | 22 | 100 |
| 7 Right sideslip | 4 | 100 | 15 | 100 |
| 8 Left turn | 8 | 100 | 38 | 95 |
| 9 Right turn | 11 | 100 | 47 | 98 |
| 10 Partial power descent | 8 | 100 | 22 | 83 |
| 11 Dive | 5 | 100 | 18 | 100 |
| 12 Autorotation | 4 | 100 | 8 | 100 |
| 13 Longitudinal reversal | 3 | 100 | 6 | 50 |
| 14 Symmetric pullup | 11 | 100 | 35 | 97 |

The foregoing description of the components of the computer system 11 employed rd the aircraft 10 as diagrammed in FIGS. 1 and 1A correspond in accordance with generally known neural network, regression or rule-based terminology to an arrangement as diagrammed in FIG. 2, wherein an input layer 26 receives the signals representing the input parameters, an output layer 28 for providing aircraft flight regime data, and one or more hidden layers 29 for operationally intermapping the input and output layers through a linear or non-linear relationship learned from measurable quantities in accordance with a suitable program available to persons skilled in the neural network art and regression or rule-based usage monitoring art, pursuant to the guidance provided herein. Thus, the system 11 is trained and the linear or non-linear input-output relationships associated therewith learned from the measurable quantities.

The method for practicing the present invention is based on programming of the neural network, regression or rule-based system 11 to perform the operational intermapping function in accordance with training and learning pursuant to the linear or non-linear input-output relationship. Such programming involves cyclic repetition of a sequence of procedural steps as diagrammed in FIG. 3. The procedural sequence is initiated by user definition of the input parameter denoted as 30, derived from previous sensor measurement generated during flight of aircraft 10 representing the variable state parameter as denoted in a subsequent step 40, measured in an aircraft fixed reference frame. Next, a determination 32 is performed from the defined input parameters for obtaining the examplars used to train the network as hereinbefore pointed out. The data used to determine such training examplars is measured under a plurality of flight conditions representing a predetermined set of flight regime maneuvers such as the 14 sampled and tabled flight maneuvers hereinbefore referred to. Then as denoted by 34 in FIG. 3, an input-output learned relationship between the defined input parameters and corresponding desired outputs is established, represented by at least one linear or non-linear equation. Such learned relationship is then stored in the data processor device 16 for example, as denoted by the storing step 36. Alternatively, such storage may be effected in a memory device associated with a ground based computer. Once the input-output relationship is stored, only current measurement of variable state parameters need be obtained through the sensors of the signal generator 12 pursuant to step 40 to estimate aircraft flight regime.

As denoted by 38 in FIG. 3, initial parameters used in calculating input parameters may be entered through the data input means 18. Then, while the aircraft 10 is undergoing a given flight regime, the onboard sensors 20 of the signal generating means 12 perform real time measurement as a variable state parameter in the aircraft fixed frame pursuant to step 40. Calculation 42 of the input parameter is then performed based on the aforementioned previously entered initial parameter and the currently measured variable state parameter resulting in storing of such calculated input parameter in the onboard memory device 14 pursuant to step 44.

As denoted by reference numeral 46 in FIG. 3, the stored input parameters are optionally processed in accordance with the linear or non-linear equations derived through the learned relationship to determine the desired output data. Finally, such output data is optionally displayed for use by aircraft occupants and recorded by an aircraft monitoring system, involving for example the aforementioned on-board display 24. By repeatedly so measuring variable parameters in sequence at a predetermined sampling rate through the sensors 20 of the signal generating means 12, followed by calculation and processing during flight by the data processor 16, the desired flight regime output may be determined onboard and displayed in a real time fashion through the display 24. Alternatively, such calculation may be performed during some post-flight period in a ground based computer system for tracking component life-time.

Obviously, other modifications and variation of the present invention may be possible in light of the foregoing teachings. It is therefore to be understood that within the scope of the appended claims the invention may be practiced otherwise than as specifically described.

What is claimed is:

1. In combination with an algorithm system located onboard an aircraft through which data from measurement of flight parameters is processed on a real time basis, a method of monitoring flight usage of the aircraft, including the steps of: sampling the flight parameters by generation of measurement signals reflecting the flight parameters; programming said sampling of the flight parameters; performing calculations of estimates on the flight usage derived from said sampled measurement signals; operationally intermapping said programming of the sampling with the estimate calculations of the flight usage for accurate determination thereof; and displaying data reflecting said accurate determination of the flight usage.

2. The combination as defined in claim 1, wherein said operational intermapping is performed in accordance with a relationship imposed by the algorithm system between the programmed sampling of the flight parameters and the accurately determined flight usage.

3. The method as defined in claim 1, wherein the flight parameters relate to: aircraft attitudes, rates, accelerations, airspeed, altitudes, engine torque and rotor speed, affected by pilot inputs and aircraft configuration.

* * * * *